Jan. 3, 1956   E. W. LOHMILLER   2,729,262
TIRE CHAIN
Filed Feb. 13, 1953

Edward W. Lohmiller INVENTOR.

BY *Clarence A. O'Brien*
*and Harvey B. Jackson*
Attorneys

United States Patent Office 2,729,262
Patented Jan. 3, 1956

2,729,262

TIRE CHAIN

Edward W. Lohmiller, Elmhurst, Ill.

Application February 13, 1953, Serial No. 336,801

2 Claims. (Cl. 152—233)

This invention relates to anti-skid devices and means for obtaining greater traction for vehicle wheels and relates more particularly to a tire chain and attaching rim device to be used with vehicle wheels.

An object of this invention is to provide an attaching rim which may be more or less permanently secured on a vehicle wheel and to which various tire chain elements may be quickly and easily attached and detached.

Another object of this invention is to provide an anti-skid device incorporating a pair of segmental rims attached to opposite sides of a vehicle wheel and which are provided with a plurality of slots through which the ends of anti-skid chains may be attached in position over a mounted tire.

A further object of this invention is to provide anti-skid chains which are formed at their ends to cooperate with slots in the attaching rims to prevent accidental disengagement of the chains from the rims.

Another object of this invention is to provide a tire chain attaching rim structure which incorporates a plurality of segments provided with fastening means for urging the segments toward a common center to decrease their effective diameter so as to clampingly engage over the tire retaining rims of the vehicle wheel.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
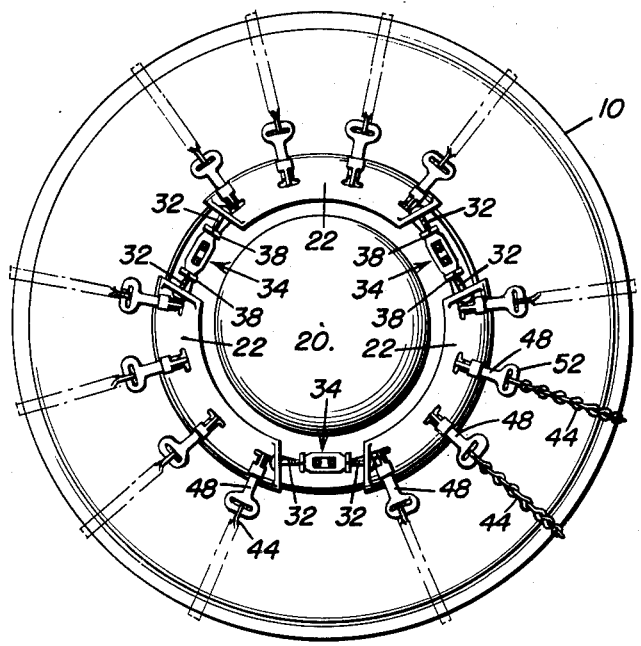
Figure 1 is a vertical elevation of a wheel utilizing the anti-skid device.
Figure 2:
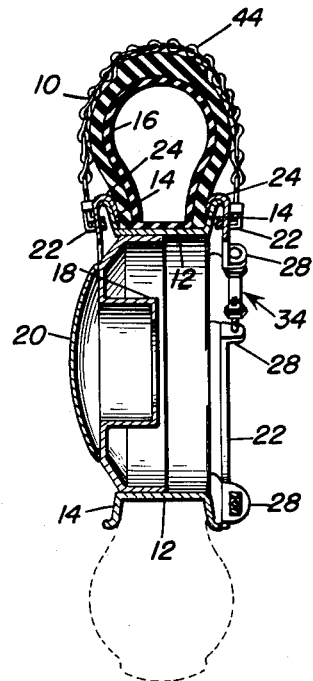
Figure 2 is a vertical transverse section through the wheel of Figure 1 and showing details of the mounting.

Referring now more particularly to the drawings, reference numeral 10 indicates a tire casing mounted on a drop center rim 12 and maintained in place thereon by the tire retaining flanges 14. The usual inner tube 16 is provided within the tire casing to maintain the same in inflated relation and the wheel also includes a central attaching portion 18 secured to the rim and reference numeral 20 indicates a conventional hub cap.

Figure 3:
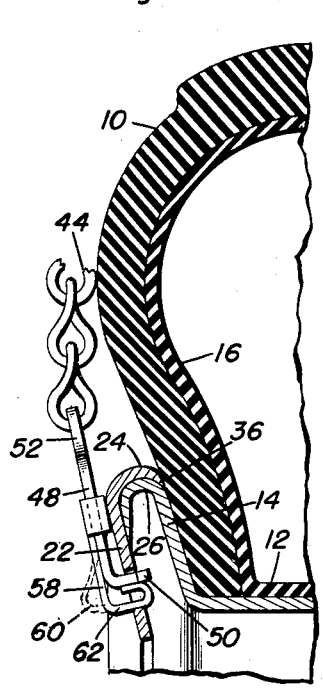
Figure 3 is an enlarged section of a portion of the wheel shown in Figure 2.

Referring more particularly to Figures 1 and 3, an attaching rim or ring for securing tire chains to the tire or wheel comprises a plurality of segments 22 which are provided with peripheral portions 24 formed as hooks for engagement over the outturned lip portion 26 of the tire retaining flanges 14. Each of the segments is provided adjacent its end with an outturned ear 28 having an aperture 30 through which the bolts 32 of turnbuckle assemblies 34 are inserted. When the segments are inserted or engaged over the flange lip 26, their tapered or wedge shaped inner ends 36 seat between the tire casing and the retaining flange 14 and the various segments may be clampingly engaged upon the wheel by tightening the turnbuckle assemblies 34. Subsequent loosening of the turnbuckle assemblies is prevented by the provision of lock nuts 38 on each of the turnbuckle bolts 32.

All of the attaching segments utilized embody the structure as above described but differ in other respects in a manner presently apparent.

Figure 4:
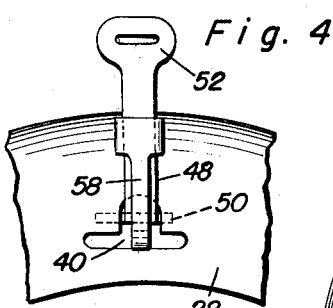
Figure 4 is a vertical elevation of a portion of the attaching ring on an enlarged scale and showing the end of one of the skid chains in place.
Figure 5:
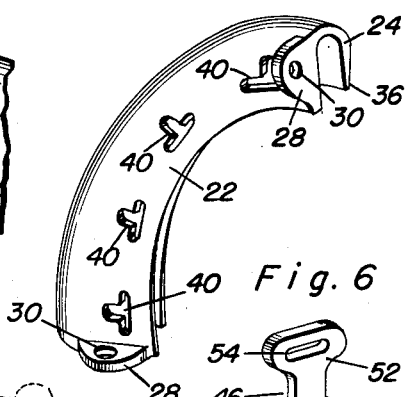
Figure 5 is a perspective view of one of the segments of the attaching rings.

Referring now more particularly to Figures 4 and 5, the segment shown is one of those which is to be used on the outer side of a wheel and incorporates a plurality of peripherally or circumferentially spaced substantially hat-shaped, or T-shaped, apertures or slots 40 whose greater dimension is disposed toward the center of the wheel, as clearly shown.

Figure 7:
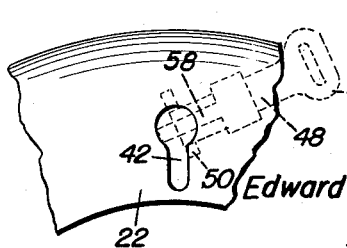
Figure 7 is a view similar to Figure 4 but showing an inner attaching ring with a skid chain end in dotted lines being engaged within the ring slot.

Referring now more particularly to Figure 7, the portion of the segment shown is to be used on the inner side of a wheel and these segments are provided with a plurality of circumferentially spaced substantially key-hole shaped slots 42 presenting their lesser dimension toward the center of the wheel and it is to be understood that the two types of attaching segments shown differ in respect to the particular configuration of their slots only.

Figure 6:
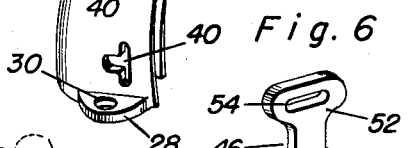
Figure 6 is a perspective view of one of the skid chain ends.

A plurality of separate chains 44 are adapted to be secured in oppositely disposed slots of the attaching ring segments and are provided at their ends with securing link portions 46, see Figure 6. Each of the end links is of substantially T-shaped configuration having an upright portion 48 and a laterally offset or outwardly bent cross bar portion 50. The inner end 52 of these members are flattened or enlarged and are provided centrally thereof with apertures 54 through which the ends of the chains 44 are secured and intermediate portion of the upright portions 48 has clamped thereto, as at 56, one end of a resilient L-shaped latching element 58 whose free end 60 is laterally offset beneath the cross bar portion 50 and which is reversely bent upon itself at its end to present a portion 62 abutting the undersurface of the cross bar portions 50. The latching member 58 is preferably formed of fairly light weight spring steel.

As shown in Figure 7, when it is desired to attach one of the skid chains to the inner attaching ring, the end portion 46 of the chain must be disposed in tangential relation to the diametrical plane of the wheel so that the relatively wide cross bar portion 50 may be inserted within the confines of slot 52 whereupon the chain end is rotated substantially 90° to latch or lock it in place on the ring. The position of the chain end as shown in dotted lines in Figure 7 is one in which the cross bar portion 50 has been inserted through the slot 42 and is in the process of being rotated to the latched position.

In order that the opposite end portion of the chain may be secured to the other attaching ring assembly, the slots 40 are formed as shown, and it will be readily apparent that to effect engagement of the cross bar 50 within these slots it is necessary to force the cross bar through the inner portion of these slots, which action will force the latching members 58 to be deformed outwardly or away from the chain ends 48, see Figure 3, to allow the cross bar to engage through the inner or lower portion of the hat-shaped slots. The chain end may then be forced outwardly or upwardly within the outer portion of slot 40 whereupon the portion 60 of latching member 58 will snap inwardly toward the tire within the confines of slot 40 and thereby prevent subsequent accidental disengagement of the chain end from the slot.

Obviously, to effect removal of a chain element it is merely necessary to deform the inturned portion 60 of latching element 58 out of the slot 40 whereupon the chain end may be urged toward the center of the wheel until the cross bar portion 50 may be slipped outwardly of the lower portion of the hat-shaped slot whereupon rotation of the other end of the chain element will permit its cross bar portion 50 to be disengaged from the keyhole slot 42. In this matter, any desired number of chain elements may be secured to the wheel in a rapid and efficient manner. Therefore, it becomes a simple matter for an operator to add or remove chain sections as required by the conditions of the road upon which he is travelling. The attaching ring assemblies may be readily removed or assembled to the wheels or they can be left on substantially permanently, that is, all year round and the chain elements suitably stored within the trunk so as to be ready for use on any occasion.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In a wheel having a rim adapted to receive a tire and having tire retaining flanges at either side thereof, a segmental attaching ring on each side of the wheel having portions for engaging over its corresponding flange, one of said rings having peripherally spaced slots of greater dimension toward the center of the wheel than toward the periphery, the other of said rings having peripherally spaced slots of greater dimension toward the periphery of the wheel than toward the center, tire chains extending over the tire and having their opposite ends secured to corresponding rings through said slots, the ends of each of said chains terminating in a T-shaped member for interlocking with one of the slots and having a laterally offset end, and resilient L-shaped latches secured to said members for latching said members in said one ring.

2. The combination of claim 1 wherein said latches comprises a strip of resilient material secured at one end to each of said members, each strip having its free end laterally offset beneath the offset end of the associated member and reversely bent upon itself to abut the undersurface of the same and one end of the slot with which said member interlocks.

References Cited in the file of this patent

UNITED STATES PATENTS

| | | |
|---|---|---|
| 1,184,175 | Goodall | May 23, 1916 |
| 2,598,594 | Perlman | May 27, 1952 |
| 2,631,637 | Purdy | Mar. 17, 1953 |
| 2,637,363 | Perlman | May 5, 1953 |